Patented July 19, 1927.

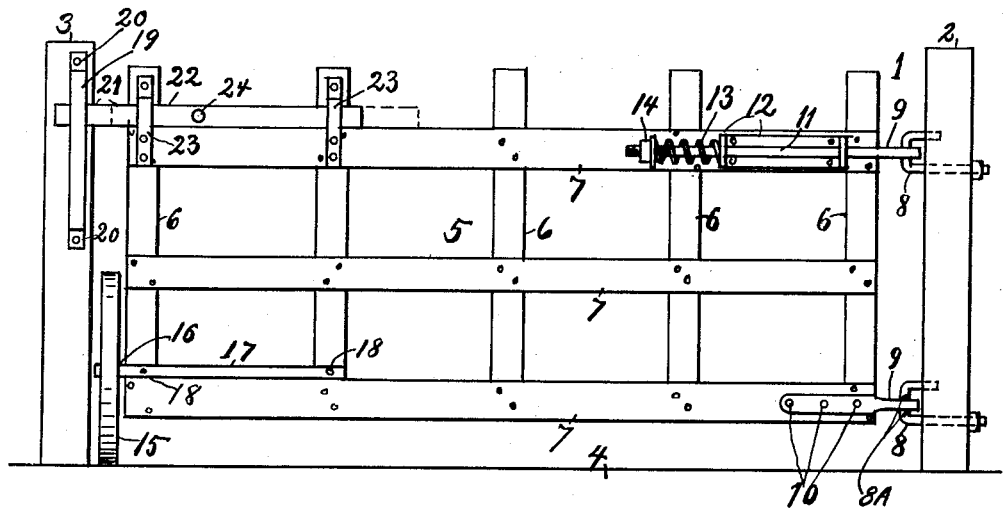

1,636,571

UNITED STATES PATENT OFFICE.

LEO LIEPOLD, OF HERON LAKE, MINNESOTA.

GATE.

Application filed April 3, 1926. Serial No. 99,517.

This invention relates to a gate particularly adaptable for farm use and has for its object the providing of a large gate with two different means for supporting it the desired height from the ground over which it swings on hinges.

In the accompanying drawing I have shown a side elevation of my improved gate.

Referring to the drawing by reference numerals, 1 designates the gate opening between two gate posts 2 and 3 fixed in the ground 4 and holding the adjacent ends of the fence (not shown).

5 designates the gate proper of the large type for barring or permitting passage of teams, cattle, vehicles etc., through the opening 1. The gate is preferably of the skeleton form made of vertical bars 6 and horizontal bars 7. One end of the gate is mounted on the post 2 by hinges composed of staple-like members 8 and members 9 having some vertical play on the staples. The said staples 8 are of U-shape form.

Of said members 9 the lower one is rigidly secured at 10 on the gate but the upper one has a rod 11 slidable in a bearing 12 fixed on the gate and has a compression coil spring 13 placed upon it between the bearing and a nut threaded on the rod where it serves to resist the spring and also regulate its compression.

The other or swinging end of the gate is partly supported by a ground wheel 15 which is rotatable on the end portion 16 of short shaft or arm 17 secured at 18 on the gate.

The latching means of the gate consists of a vertically disposed keeper 19 fixed at 20 on the post 3 and offset so as to leave a vertical slot of considerable length between the keeper and the post. When the gate is closed and latched said slot is occupied by the outer end portion 21 of a horizontal slide 22 which is slidable in bearings 23 fixed on the gate and has a knob to take hold of in moving it to either latch or unlatch the gate.

For a more full understanding of the merits of the invention it must be considered that if the spring 13 alone was depended on to support the gate there would be an undue strain on the fence post 2, and owing to the change of the weight of the gate in rain, snow, sleet and storms the clearance between the gate and the ground would at various times be changed beyond usefulness; and the gate might also be ruined by children swinging on it. If only the wheel 15 is depended on as a support it is apt to dig a deep path in the driveway especially during rainy weather, but by combining said two supporting means all these difficulties are avoided, and if the ground is uneven from plowing or otherwise children cannot ride on the gate because such riding will cause the gate to sag and engage any and all unevenness of the ground. In opening and closing the gate the wheel will only cause it to ride gently over obstructions.

What I claim is:

1. A device of the kind described, comprising two fixed gate posts, a gate having one end hinged to one of the posts by hinges having a vertical play, the swinging end of the gate having an arm projecting beyond it and a ground wheel rotatable on said arm, and a spring at the hinged end of the gate arranged to further support the gate that the wheel will not be unduly worked into the ground, and means on the wheel-supported end of the gate and on the other post for latching the gate.

2. The structure specified in claim 1, in which each hinge member on the gate post consists of a U-shaped bar having its arms driven into the post and its middle portion forming a vertically disposed pintle spaced from the post, a hinge member on the gate for each of said U-shaped members and oscillably mounted on the vertical part of the same.

In testimony whereof I affix my signature.

LEO LIEPOLD.